(12) United States Patent
Barbu et al.

(10) Patent No.: US 7,950,901 B2
(45) Date of Patent: May 31, 2011

(54) SYSTEM AND METHOD FOR LOADS REDUCTION IN A HORIZONTAL-AXIS WIND TURBINE USING UPWIND INFORMATION

(75) Inventors: Corneliu Barbu, Saratoga Springs, NY (US); Parag Vyas, Munich (DE)

(73) Assignee: General Electric Company, Niskayuna, NY (US)

( * ) Notice: Subject to any disclaimer, the term of this patent is extended or adjusted under 35 U.S.C. 154(b) by 960 days.

(21) Appl. No.: 11/891,870

(22) Filed: Aug. 13, 2007

(65) Prior Publication Data

US 2009/0047116 A1 Feb. 19, 2009

(51) Int. Cl.
*F03D 7/04* (2006.01)

(52) U.S. Cl. ............... 416/1; 416/41; 416/61; 416/117; 415/1; 415/4.3; 415/48; 415/147; 415/905; 415/908

(58) Field of Classification Search ............... 415/1, 2.1, 415/4.1, 4.3, 4.5, 47, 48, 147, 905, 908; 416/1, 416/41, 61, 117; 290/44, 55
See application file for complete search history.

(56) References Cited

U.S. PATENT DOCUMENTS

| | | | |
|---|---|---|---|
| 4,339,666 A * | 7/1982 | Patrick et al. | 290/44 |
| 4,651,017 A * | 3/1987 | Longrigg | 290/44 |
| 6,320,272 B1 * | 11/2001 | Lading et al. | 290/44 |
| 2006/0140764 A1 | 6/2006 | Smith et al. | 416/103 |
| 2006/0145483 A1 * | 7/2006 | Larsen et al. | 290/44 |

\* cited by examiner

*Primary Examiner* — Igor Kershteyn
(74) *Attorney, Agent, or Firm* — Ann M. Agosti

(57) ABSTRACT

A system and method provide a proactive mechanism to control pitching of the blades of a wind turbine to compensate for rotor imbalance during normal operation by pitching the blades individually or asymmetrically, based on turbulent wind gust measurements in front of the rotor, determined before it reaches the rotor blades.

16 Claims, 3 Drawing Sheets

Θ : CONE ANGLE
R : RANGE

MEASURED COMPONENT OF WIND VELOCITY

SYSTEM AND METHOD FOR LOADS REDUCTION IN A HORIZONTAL-AXIS WIND TURBINE USING UPWIND INFORMATION

BACKGROUND

The invention relates generally to wind turbines, and, in particular, to a system and method for reducing the load imbalance seen by the turbine components (rotor, drive train, tower) during normal operation.

Wind turbines are regarded as environmentally friendly and relatively inexpensive alternative sources of energy. A wind turbine generator generally includes a wind rotor having a plurality of blades that transform wind energy into rotational motion of a drive shaft, which in turn is utilized to drive a rotor of an electrical generator to produce electrical power. In modern wind power generation systems, power output from a plurality wind turbine generators, comprising a "wind farm", is typically combined for transmission to a grid.

Power output of a wind turbine generator generally increases with wind speed until a rated power output is reached. Thereafter, the power output is usually maintained constant at the rated value even with an increase in wind speed. This is generally achieved by regulating the pitching action of the blades in response to an increase in wind speed. With increase in wind speed beyond the rated power output, the blades generally are pitched toward feather (i.e., twisted to be more closely aligned with the direction of the wind), thereby controlling the angular speed of the rotor. As a result, generator speed, and consequently, generator output may be maintained relatively constant with increasing wind velocities.

In case of sudden turbulent gusts, wind speed, wind turbulence, and wind shear may change drastically in a relatively small interval of time. Reducing rotor imbalance while maintaining the power output of the wind turbine generator constant during such sudden turbulent gusts calls for relatively rapid changes of the pitch angle of the blades. However, there is typically a time lag between the occurrence of a turbulent gust and the actual pitching of the blades based upon dynamics of the pitch control actuator and the inertia of the mechanical components. As a result, load imbalances and generator speed, and hence oscillations in the turbine components as well as power, may increase considerably during such turbulent gusts, and may reduce the life of the machine and exceed the maximum prescribed power output level (also known as overspeed limit) causing the generator to trip, and in certain cases, the wind turbine to shut down. The overspeed limit is generally a protective function for the particular wind turbine generator and is based upon fatigue considerations of the mechanical components, such as the tower, drive train, and so forth. Moreover, sudden turbulent gusts may also significantly increase tower fore-aft and side-to-side bending moments due to increase in the effect of wind shear.

Reduction of loading has heretofore been addressed only as pitching the wind turbine blades while taking into account the upwind wind speed measurement, to alleviate the impact of turbulent gust winds on the turbine. Consequently, rotor imbalance due to wind shear and turbulence has only been addressed through pitching of wind turbine blades in a reactive manner, based on tower loading due to wind inflow.

Accordingly, there exists a need for a proactive mechanism to control pitching of the blades of a wind turbine to compensate for rotor imbalance during normal operation by pitching the blades individually or asymmetrically, based not only on the wind speed, but also on the wind turbulence and wind sheer dynamics in front of the rotor, determined before it reaches the rotor.

BRIEF DESCRIPTION

Briefly, in accordance with one embodiment of the present invention, a method is provided for proactively reducing rotor imbalances of a wind turbine generator in response to an anticipated change in wind dynamics. The method, in one embodiment, includes:

sensing a plurality of upwind wind dynamics at a desired distance from at least one wind turbine blade in a direction of the wind coming toward the wind turbine generator, wherein at least one of the wind dynamics is distinct from wind speed; and controlling pitch of at least one blade of the wind turbine generator based upon the plurality of sensed wind dynamics in advance of a change in wind dynamics at the at least one blade, such that rotor imbalance due to wind shear and/or wind turbulence is reduced across the rotor.

According to another embodiment, a method for controlling rotor imbalance of a wind turbine generator in response to an anticipated change in transient wind dynamics, comprises:

sensing a plurality of upwind wind dynamics at a desired distance from the wind turbine generator in a direction of the wind, wherein at least one sensed upwind wind dynamic is distinct from upwind wind speed;

determining a feed forward signal based upon a change in the sensed plurality of upwind wind dynamics; and utilizing the feed forward signal to determine individual blade pitch command signals configured to preemptively and asymmetrically control pitch of a plurality of wind turbine blades in advance of a change in upwind wind dynamics at the wind turbine generator, such that rotor imbalance due to wind shear and/or wind turbulence is reduced across the rotor.

According to yet another embodiment, a wind turbine comprises a plurality of blades mounted on a rotor;

at least one upwind wind dynamics sensor configured to sense a plurality of upwind transient wind dynamics at a desired distance from the wind turbine generator in a direction of the wind moving toward the wind turbine generator, wherein at least one upwind transient wind dynamic is distinct from wind speed; and a pitch control system configured to asymmetrically control pitch of a plurality of blades of the wind turbine generator based upon a change in the plurality of sensed transient wind dynamics in advance of a change in transient wind dynamics at the plurality of blades, such that rotor imbalance due to wind shear and/or wind turbulence is reduced across the rotor.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The following description presents a system and method according to one embodiment, for generating upwind information provided by a look-ahead wind measurement sensor and using this information to determine the loading the rotor of a wind generator will experience, as that slice of wind hits the turbine. Based on the estimated imbalance in the rotor, the blade angle is changed such that the rotor sees the same uniform loading all across the rotor. The system and method can also be employed to control power output of a wind turbine generator during sudden changes in wind speed, wind shear and wind turbulence such as during a turbulent gust by maintaining the generator speed within the overspeed limit (or protective threshold) during such turbulent gusts, thus preventing tripping or shutdown of the wind turbine generator during turbulent wind gusts. Embodiments of the present technique provide a control oriented sensing methodology to obtain wind speed, wind turbulence and wind sheer information using upwind wind measurement sensors and a set of control algorithms that process the upwind wind speed, turbulence and sheer information to generate individual blade pitch commands to individually pitch the wind turbine blades ahead in time when a turbulent wind gust occurs, thereby resulting in increased wind energy capture and reduced dynamic loads on the wind turbine structure (rotor, drive train, tower, etc.). Embodiments of the system and method are described in detail below referring generally to FIGS. 1-7.

Turbulent gust(s) as used herein means a complex wind regime that includes not only wind speed, but other wind dynamics such as but not limited to wind turbulence, wind shear, and the like. Known models for wind gust have only considered wind speed and do not include other wind dynamics.

Figure 1:
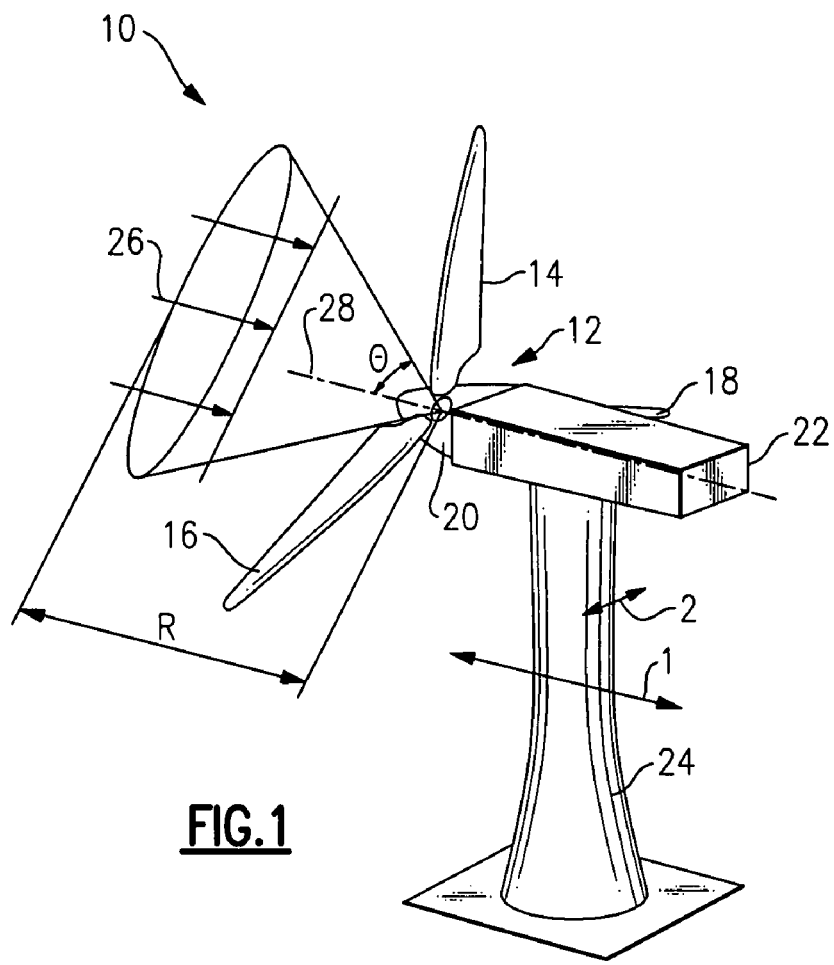
FIG. 1 illustrates a wind turbine generator in accordance with one embodiment of the present invention.
Figure 5:
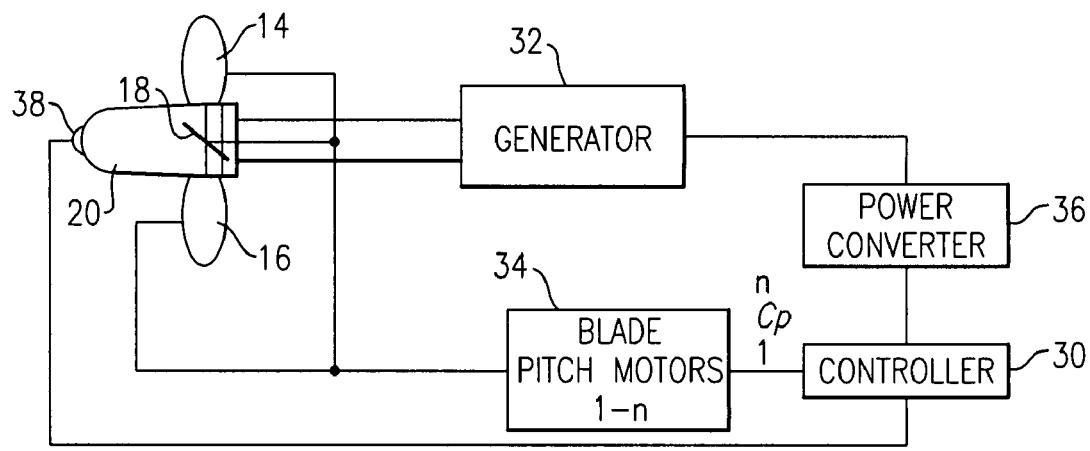
FIG. 5 illustrates the functional elements of the wind turbine generator in accordance with one embodiment of the present invention.

Turning now to the drawings, FIG. 1 illustrates a wind turbine generator 10 in accordance with one embodiment of the present invention. The wind turbine generator 10 comprises a rotor 12 having a plurality of wind turbine blades 14, 16, 18 mounted on a hub 20. The wind turbine generator 10 also comprises a nacelle 22 that is mounted atop a tower 24. The rotor 12 is drivingly coupled to an electrical generator 32 such as depicted in FIG. 5, via drive train housed within the nacelle 22. The tower 24 exposes the blades 14, 16, 18 to the wind (directionally represented by arrows 26), which causes the blades 14, 16, 18 to rotate about an axis 28. The blades 14, 16 and 18 transform the kinetic energy of the wind into a rotational torque, which is further transformed into electrical energy via the electrical generator housed within the nacelle 22.

Figure 2:
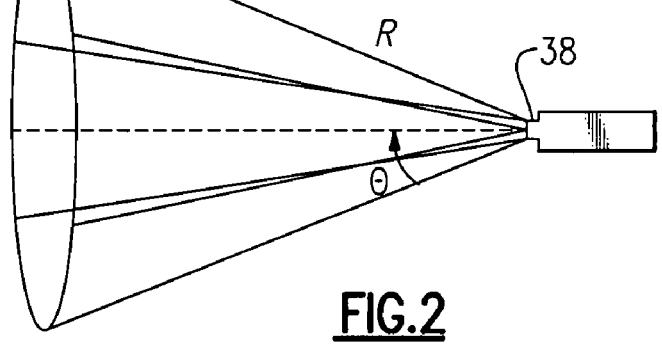
FIG. 2 illustrates a light detection and ranging device (LIDAR) and its associated measured components of wind velocity.

FIG. 2 is a simplified picture illustrating a LIDAR 38 and its associated measured components of wind velocity that are measured within a predetermined cone angle (θ) and range (R) that may be suitably selected to provide a desired accuracy of measurement as well as an acceptable sensitivity. The LIDAR 38 is described in further detail herein below.

Figure 3:
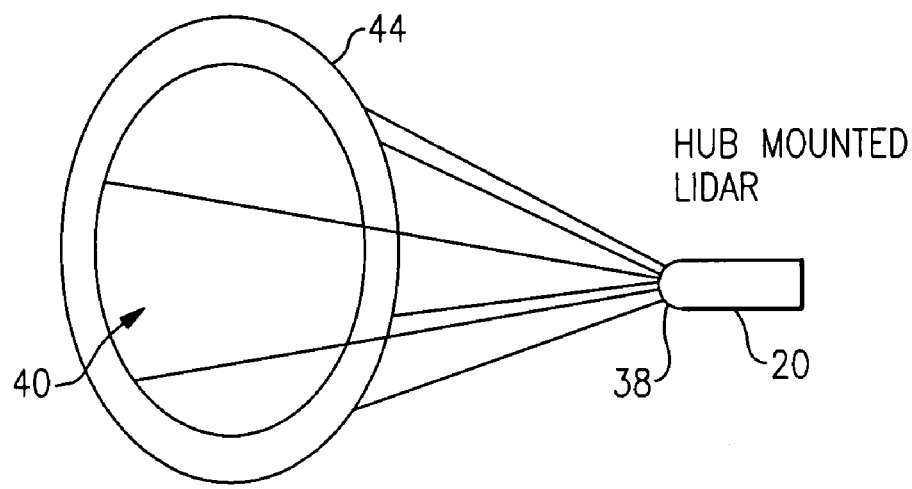
FIG. 3 illustrates a LIDAR mounted on a wind turbine hub and configured to measure a predetermined portion of a planar field in front of the hub.

FIG. 3 illustrates a LIDAR 38 mounted on a wind turbine hub 20 and configured to measure components of wind velocity within a predetermined portion 44 of a planar field 40 in front of the hub 20.

Figure 4:
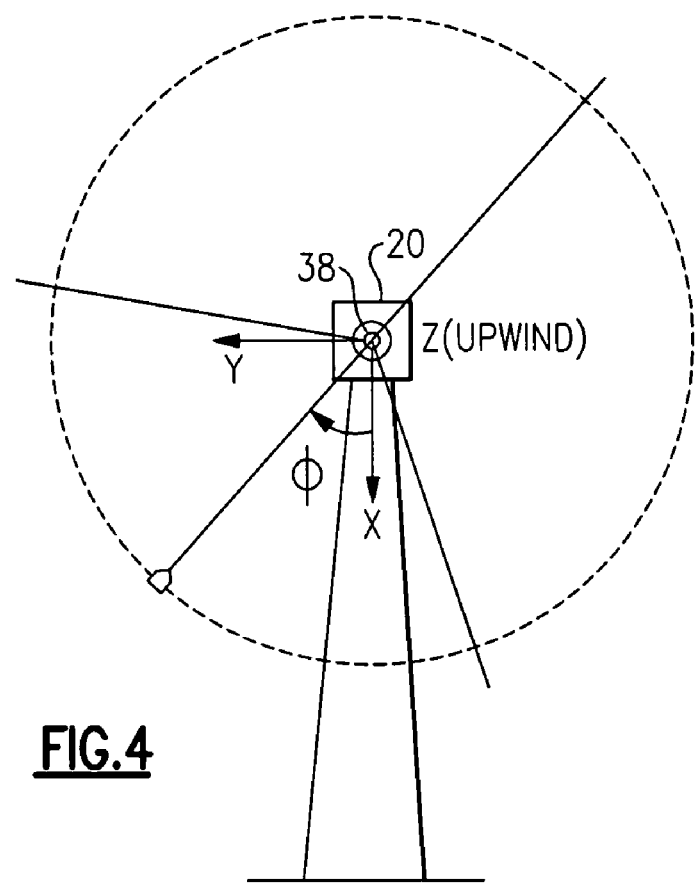
FIG. 4 illustrates a frontal view of the LIDAR depicted in FIG. 3.

FIG. 4 illustrates a frontal view of the LIDAR 38 mounted on a wind turbine hub 20 depicted in FIG. 3. The cone angle (θ) is shown in the x-y plane, where the z-axis represents the axis of rotation of the blades 14, 16, 18 shown in FIG. 1.

FIG. 5 is a block diagram of the primary functional elements of the wind turbine generator 10 according to one embodiment. As illustrated, the blades 14, 16, 18 of the wind turbine generator 10 drive an electrical generator 32 that is housed within the nacelle 22 depicted in FIG. 1. The wind turbine generator 10 further comprises a controller 30 configured to control electrical power output of the generator 32 based upon sensed wind speed and at least one other dynamic such as wind sheer or wind turbulence. Power output of the electrical generator 32 may be controlled via preemptively and individually controlling the pitch of the blades 14, 16, 18 via blade pitch motors 34. Controlling air-gap torque of the generator 32 via one or more power converters 36 may also simultaneously control power output of the generator 32.

For low wind velocities, an increase in speed of the wind under certain wind turbulence and wind sheer conditions can cause an increase in the rotational speed of the blades 14, 16, 18, and consequently, the electrical power output of the generator 32. In certain embodiments, electrical power output is allowed to increase with wind speed until a rated power output level is reached. With further increases in wind speed, the power output of the generator 32 is maintained substantially constant. This is achieved by pitching one or more of the blades 14, 16, 18 toward feather. In this discussion, pitching refers to twisting the wind turbine blade to change the angle of attack of wind on the blade. Pitching toward feather implies twisting of the blade such that the blade surface is aligned along direction of the wind speed 26 (i.e., reducing the angle of attack). Pitching a blade toward feather leads to a decrease wind energy capture by the blade. Hence, with certain increases in the wind speed, the blades are progressively pitched towards feather, to maintain a substantially constant generator speed, and consequently, a steady generator power output.

As stated herein before, in case of sudden turbulent gusts, wind speed, turbulence and/or wind shear may increase or even decrease in a relatively small interval of time. In order to compensate for time lag of the blade pitch motors 34 and maintain a uniform loading across the rotor 20, and also maintain a constant power output of the wind turbine generator 10 during such sudden turbulent gusts, or at least a relatively smooth or controlled change in output, the blades 14, 16, 18 can be preemptively and individually pitched before a turbulent gust hits the turbine, thereby preventing the wind turbine generator 10 from reaching its overspeed (or under speed) limit upon occurrence of a gust. To implement this preemptive pitching, wind dynamics including but not limited to wind speed, wind shear and wind turbulence are sensed upwind of the blades 14, 16, and 18 via one or more upwind wind measurement sensors 38. Wind shear and wind turbulence information are determined from the wind speed information to provide a more complete and accurate profile of the wind dynamics for use by the proactive pitch control mechanism.

In the illustrated embodiment, a sensor 38 includes a light detection and ranging device, also referred to as LIDAR. Referring back to FIG. 1, the LIDAR 38 is a measurement radar which is configured to scan an annular region around the wind turbine generator 10 and measure wind speed based upon reflection and/or scattering of light transmitted by the LIDAR from aerosol. The cone angle (θ) and the range (R) of the LIDAR 38 may be suitably selected to provide a desired accuracy of measurement as well as an acceptable sensitivity. In the illustrated embodiment, the LIDAR 38 is located on the hub 20 whereupon the blades 14, 16, 18 are mounted. In certain alternate embodiments, the LIDAR 38 may also be located around the base of the wind turbine tower 24.

In accordance with aspects of the present technique, the LIDAR 38 is configured to measure wind speed ahead of at least one specific portion, typically the most significant sections of the blades 14, 16, 18 in terms of contributions of those sections to aerodynamic torque on the blades. These sections may include, for example, sections close to the tip of the blade. FIG. 3 illustrates one such measurement field 44. The points ahead of the blades 14, 16, 18 at which wind speed is measured by the LIDAR 38 is represented by a plane 40 in FIG. 3.

According to one embodiment, the potential load seen by the wind turbine 10 when reading wind information in front of the structure is to correlate the upwind information that may include without limitation, wind speed, wind shear, and wind turbulence information, with the load measurement provided by main flange sensors, blade root sensors or main shaft sensors, and to estimate the time when the new blade pitch setting has to occur to compensate for this imbalance from the distance ahead of the wind turbine 10 where the wind speed, turbulence and shear has been recorded.

As illustrated in FIG. 5, the upwind wind speed, shear and turbulence sensed by the LIDAR 38 is utilized by the controller 30 to determine individual blade pitch commands $$\left(\overset{n}{\underset{1}{C_p}}\right),$$

where n is the number of wind turbine blades, and wherein the individual blade pitch commands are transmitted to each individual blade pitch motor within a plurality of blade pitch motors 34 to implement actual change in pitch of each blade 14, 16, 18 by the blade pitch motors 34. The control mechanism implemented by the controller 30 is described in greater detail below with reference to FIG. 6.

Figure 6:
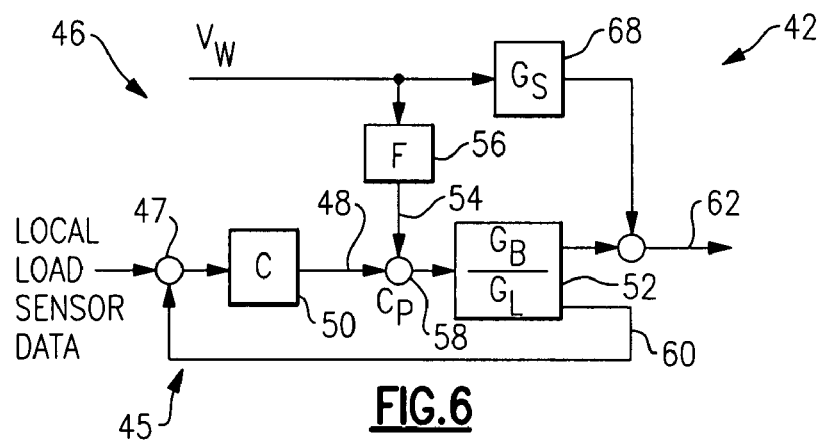
FIG. 6 is a system control diagram illustrating a control strategy to implement individual blade pitch control in accordance with one embodiment of the present invention.

FIG. 6 is a schematic diagram illustrating an exemplary control mechanism 42 to implement preemptive and/or individual blade pitch control in accordance with one embodiment of the present invention. The control mechanism 42 incorporates a feedback control system 45 and a feed forward control system 46. The feedback control system 45 is configured to determine and feed back corrected load values sequentially for each blade 14, 16, 18 at summation point 47, based on rotational speed C of the wind turbine blades 14, 16, 18, and also on measured components F of wind velocity generated by the LIDAR 38 described herein before. Locally measured load sensor data is then adjusted to asymmetrically implement a desired change in the rotational speed of each blade 14, 16, 18 at block 50 and generate a corresponding output 48 indicative of a required change in blade pitch angle $$\left(\overset{n}{\underset{1}{C_p}}\right)$$

to achieve the requisite speed and reduction in rotor imbalance. At block 52, the effect of changing the blade pitch based on a plurality of dynamics of the wind and rotor speed are separated to determine the actual changes to the active flow modification devices employed to alter aerodynamics of the blades 14, 16, 18, and load values respectively. The gain $G_B$ is based upon dynamics of the turbulent wind including without limitation wind speed, wind shear and wind turbulence, while the gain $G_L$ is based on rotor speed dynamics. As will be appreciated, the output 48 of the feedback control system 45 is configured to cause a decrease in blade pitch angle when the generator blade speed exceeds a reference speed and an increase in blade pitch angle when the generator blade speed is lesser than the reference speed. Thus, under normal operation of the wind turbine generator 10, the output 48 acts preemptively and individually upon each of the blade pitch motors 34 such that the rotor imbalance is minimized and the overall wind generator speed is maintained at a desired constant reference level.

The feed forward system 46 utilizes the upwind wind speed information ($V_W$) from the LIDAR 38 and generates an output 54 that is configured in combination with other turbulent wind dynamics such as, but not limited to, wind shear and wind turbulence, to asymmetrically cause the blades to pitch in advance of a sudden change in wind turbulence, the amount of pitch being individually determined for each blade 14, 16, 18. The feed forward system 46 incorporates a gain F on the wind speed data ($V_W$) at block 56 to produce the output 54. The output 54 of the feed forward control system is summed up at junction 58 with the output 48 of the feedback control system 45 to produce individual blade pitch commands, $$\left(\overset{n}{\underset{1}{C_p}}\right).$$

In one embodiment, this gain F is directly proportional to the term $G_B G_L^{-1}$, wherein $G_B$ is based upon the influence of wind speed, wind shear and wind turbulence on blade dynamics, as stated herein before. Thus, during a turbulent gust, the sudden change in the wind speed is sensed upwind of the blades 14, 16, 18, causing an increase in the output 54 of the feed forward system 46, and consequently, a change in each blade pitch command ($C_P$). This in turn causes the blade pitch motors 34 to asymmetrically pitch the blades before the turbulent gust actually reaches the wind turbine generator 10. The technique thus ensures that the rotor imbalance caused by wind shear and turbulence is reduced and that power output of the wind generator 10 is reduced gradually and that the generator speed does not exceed the overspeed limit that would cause it to trip. In certain embodiments, the gain F may be further proportional to the sensed wind speed, such that stronger the turbulent gust, faster is the response of the feed forward system 46 to modify the blade pitch commands, $$\left(\overset{n}{\underset{1}{C_p}}\right).$$

A scaled pitch gain 68 can further be added to the wind dynamics at the output 62 to provide command modifications to active flow modification devices associated with each blade 14, 16, and 18.

Figure 7:
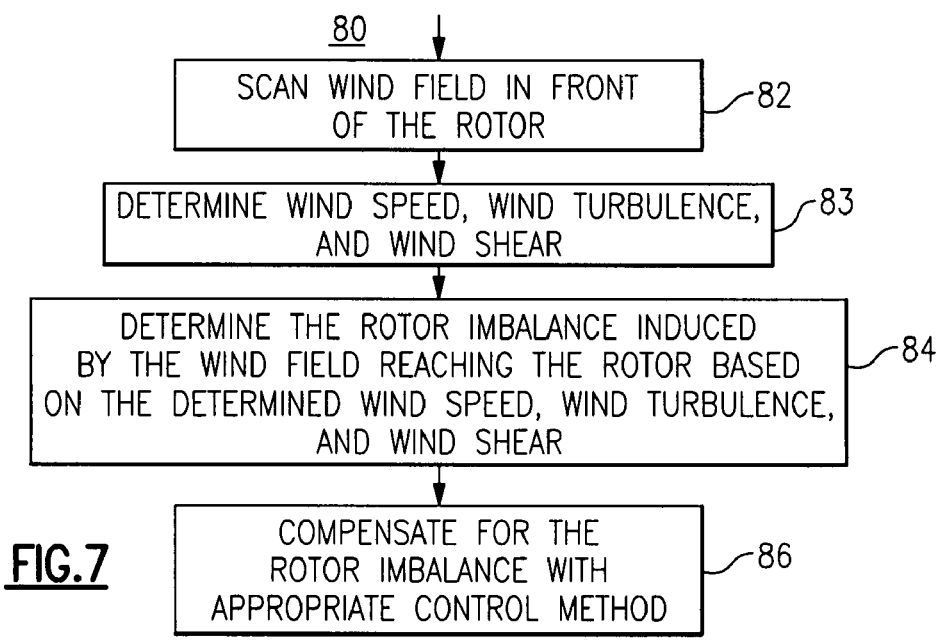
FIG. 7 is a flowchart illustrating a method of controlling individual blade pitch in accordance with one embodiment of the present invention.

FIG. 7 is a flowchart illustrating an exemplary method 80 for compensating for rotor imbalance across a wind turbine due to wind turbulence and shear and also for controlling power output of a wind turbine generator 10 in accordance with aspects of the present technique. The method 80 begins by scanning the upwind wind field in front of the rotor as represented in block 82. Block 82 may incorporate use of a LIDAR 38 to scan the wind field ahead of the most significant sections of the blades 14, 16, 18 in terms of aerodynamic torque to determine sudden changes, for example, in wind speed, wind shear and wind turbulence.

At block 83, wind speed, wind turbulence and wind shear are determined from the scanned wind field information.

At block 84, the rotor imbalance induced by the wind field reaching the rotor is determined based on the foregoing wind speed, wind turbulence and wind shear information.

In one embodiment, the upwind sensor 38 determines the velocity of the wind ahead of the turbine and determines what would be the loading seen by the turbine components, in particular the rotor, when the wind reaches the turbine. Block 82 may incorporate a feedback control system as illustrated in FIG. 3 above. A control algorithm, such as described above with reference to FIG. 6, determines a priori the blade angle at which each blade 14, 16, 18 must be set to when the wind reaches the rotor, to compensate for any rotor imbalance, at represented in block 84. A feed forward signal is generated based upon blade dynamics and changes in upwind wind speed, shear and turbulence. The blade pitch signal and the feed forward signal are then summed to preemptively and individually determine blade pitch commands as stated herein before with reference to FIG. 6. The blade pitch motors are actuated in response to the individual blade pitch commands, to effect preemptive pitching of the individual blades in advance of a sudden change in wind speed, wind shear and/or wind turbulence dynamics.

One way to understand the potential load seen by the wind turbine 10 when reading the wind information in front of the structure is to correlate the upwind information with the load measurement provided by main flange sensors, blade root sensors or main shaft sensors, and to estimate the time when the new blade pitch setting has to occur to compensate for this imbalance from the distance ahead of the turbine where the wind speed has been recorded.

The above-described techniques thus facilitate optimum use of upwind wind dynamics information to compensate for rotor imbalance and to control fluctuations in power output of the wind turbine generator during sudden changes in wind speed, wind shear, and wind turbulence, while reducing dynamic loads on the tower structure. As will be also appreciated, the above-described techniques may take the form of computer or controller implemented processes and apparatuses for practicing those processes. Aspects of the present technique may also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The techniques described may further be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling rotor imbalance of a wind turbine generator in response to an anticipated change in wind dynamics, comprising:
    sensing a plurality of upwind wind dynamics at a desired distance from at least one wind turbine blade in a direction of the wind coming toward the wind turbine generator, wherein at least one of the wind dynamics is distinct from wind speed; and
    controlling pitch of at least one blade of the wind turbine generator based upon the plurality of sensed wind dynamics in advance of a change in wind dynamics at the at least one blade, such that rotor imbalance due to wind shear and/or wind turbulence is reduced across the rotor, wherein sensing a plurality of upwind wind dynamics comprises sensing at least two wind parameters selected from upwind wind speed, upwind wind shear, and upwind wind turbulence.

2. The method of claim 1, further comprising sensing a plurality of upwind wind dynamics ahead of a specific fractional portion of the at least one wind turbine blade based upon a contribution of the specific portion to aerodynamic torque on the blade.

3. The method of claim 1, further comprising determining a blade pitch command signal based upon a difference between a local load sensor signal and a corrected load signal.

4. The method of claim 3, further comprising determining a feed forward signal in response to the change in the sensed upwind plurality of wind dynamics, and coupling the feed forward signal to the blade pitch command signal to obtain a preemptive blade pitch command signal.

5. A method for controlling rotor imbalance of a wind turbine generator in response to an anticipated change in wind dynamics, comprising:
    sensing a plurality of upwind wind dynamics at a desired distance from the wind turbine generator in a direction of the wind, wherein at least one sensed upwind wind dynamic is distinct from upwind wind speed;
    determining a feed forward signal based upon a change in the plurality of sensed upwind wind dynamics; and
    utilizing the feed forward signal to determine individual blade pitch command signals configured to preemptively and asymmetrically control pitch of a plurality of wind turbine blades in advance of a change in upwind wind dynamics at the wind turbine generator, such that rotor imbalance due to wind shear and/or wind turbulence is reduced across the rotor, wherein sensing a plurality of upwind wind dynamics comprises sensing at least two wind parameters selected from upwind wind speed, upwind wind shear, and upwind wind turbulence.

6. The method of claim 5, wherein the upwind wind turbulence is sensed ahead of at least one specific fractional portion of each wind turbine blade based upon a contribution of the at least one specific fractional portion to aerodynamic torque on the blade.

7. The method of claim 5, further comprising controlling generator speed via controlling of the pitch of at least one blade.

8. The method of claim 5, wherein the feed forward signal is determined via a gain based upon the at least one sensed upwind wind dynamic that is distinct from upwind wind speed.

9. A wind turbine, comprising:
a plurality of blades mounted on a rotor;
at least one upwind wind dynamics sensor configured to sense a plurality of upwind transient wind dynamics at a desired distance from the wind turbine generator in a direction of the wind moving toward the wind turbine generator, wherein at least one upwind transient wind dynamic is distinct from wind speed; and
a pitch control system configured to asymmetrically control pitch of a plurality of blades of the wind turbine generator based upon a change in the plurality of sensed transient wind dynamics in advance of a change in transient wind dynamics at the plurality of blades, such that rotor imbalance due to wind shear and/or turbulence is reduced across the rotor, wherein the sensed upwind transient wind dynamics are selected from wind speed, wind shear and wind turbulence.

10. The wind turbine of claim 9, wherein the at least one upwind wind dynamics sensor comprises a light detection and ranging device.

11. The wind turbine of claim 9, further comprising a feedback control system configured to determine a blade pitch command signal based upon a difference between a local load sensor signal and a corrected load value.

12. The wind turbine of claim 11, further comprising a feed forward control system configured to determine a feed forward signal in response to a change in the sensed upwind transient wind dynamics, and coupling the feed forward signal to the blade pitch command signal to preemptively and asymmetrically obtain individual blade pitch command signals.

13. The wind turbine of claim 9, wherein the pitch control system comprises means for controlling sampling the upwind transient wind dynamics at a desired distance from the wind turbine generator in a direction of the wind.

14. The wind turbine of claim 13, wherein the pitch control system further comprises means configured for determining a feed forward signal in response to a change in the sensed upwind transient wind dynamics.

15. The wind turbine of claim 14, wherein the pitch control system further comprises means configured for utilizing the feed forward signal to determine a preemptive blade pitch command signal to control pitch of no more than one individual wind turbine blade in advance of a change in transient wind dynamics at the wind turbine blade.

16. The wind turbine of claim 14, wherein the pitch control system further comprises means configured for utilizing the feed forward signal to determine a preemptive blade pitch command signal to asymmetrically control pitch of a plurality of wind turbine blades in advance of a change in transient wind dynamics at the wind turbine blade.

* * * * *